C. S. LOCKWOOD.
ROLLER BEARING FOR SIDE AND END STRAINS.
APPLICATION FILED JAN. 7, 1910.
980,426.
Patented Jan. 3, 1911.
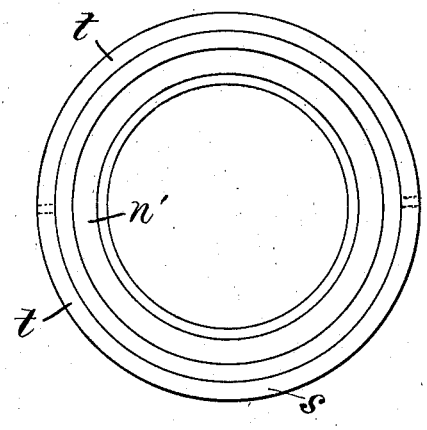
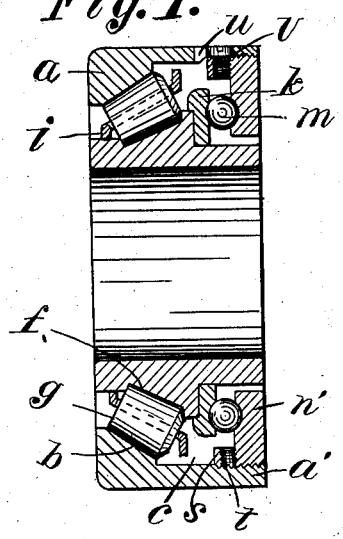
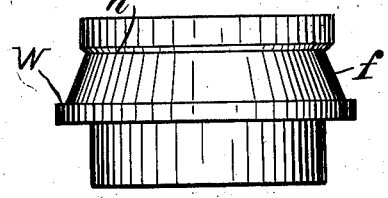
Witnesses
Julius Huber
Walter Greenbaum
Inventor
Charles S. Lockwood
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING FOR SIDE AND END STRAINS.

980,426.

Specification of Letters Patent. Patented Jan. 3, 1911.

Application filed January 7, 1910. Serial No. 536,803.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Roller-Bearings for Side and End Strains, fully described and represented in the following specification and the accompanying drawings, forming a part of the same.

This invention relates to a roller bearing having a conical hub with a series of conical rolls fitted thereto, and a casing having a tapering seat to embrace the outer sides of the rolls. Such a bearing is often employed to resist lateral strain, but any such strain tends to crowd the rolls toward the larger end of the seat within the casing and to thus force the hub endwise. This is a very objectionable feature where the casing is held immovably and the shaft having the hub is provided with parts which are intended to maintain a fixed relation to other parts, as any movement of the hub endwise tends to derange the relation of such parts. Various constructions have been devised to resist such end movement of the hub, and the construction claimed herein is for a particular organization in which a collar is formed upon the larger end of the hub to receive the end thrust of the rolls, and a ball-ring is fixed adjustably in the larger end of the casing and balls inserted directly between the same and a bearing-ring having a ball-race fixed to the outer end of the hub.

The invention will be understood by reference to the annexed drawing, in which—

Figure 1 is a longitudinal section, where hatched, of a bearing embodying the invention; Fig. 2 is an end view of the ball-ring which is fitted in the open end of the casing, and Fig. 3 is an elevation of the hub.

The casing $a$ is shown cylindrical to be held in a socket when in use, and has a tapering seat $b$ at one end and a shell $a'$ extended toward the other end with a chamber $c$ inside of the same, in which an adjustable ball-race is secured.

The hub has a conical seat $f$ with collars $h$ and $w$ respectively at its smaller and larger ends, and the tapering rolls $g$ are fitted to the seats $b$ and $f$, and are made of such length as to touch the collars $h$ and $w$. A cage $i$ is shown to guide the rolls in their movement upon the seats. The hub is shouldered down at its larger end and a bearing-ring having a ball-race $k$ is fitted thereto, and in practice is made larger than the collar $w$.

By making the ball-race separately and fitting it upon the hub, a cheaper construction is secured, as the hub is commonly made from solid stock, and stock of such greater diameter would be required if the ball-race were made integral therewith.

The shell $a'$ is threaded upon its inner side and a ball-ring $n'$ is fitted to screw within such thread, and is formed with a circular flange $s$ provided with radial tap-holes $t$. A screw $v$ is shown inserted through a slot $u$ in the edge of the shell into one of the holes $t$ in the ball-ring. The adjacent faces of the ball-ring $n'$ and ball-bearing-ring $k$ are suitably grooved to admit balls $m$, and the ball-ring is adjusted in the casing by means of the screw-thread when all the parts are assembled, so as to hold the rolls in snug contact with the seat $b$ in the casing. When the ball-ring is thus adjusted, the screw $v$ is inserted in one of the holes $t$, thus keeping the ball-ring locked in position.

With this construction, it will be seen that all the end thrust upon the hub which is produced by lateral strain upon the bearing is confined to the casing, as the shell $a'$ forms a connection between the seat $b$ for the rolls and the ring $n'$ for the balls. The tendency of the rolls to push the hub endwise when subjected to lateral strain is thus resisted by the fixtures in the opposite end of the casing, and the hub is held securely from end movement.

Having thus set forth the nature of the invention what is claimed herein is:

1. A self-contained roller bearing, consisting of a casing $a$ having a tapering seat $b$ in one end and a shell $a'$ upon the other end, a conical hub arranged within the casing and having a conical seat $f$ with annular shoulder $w$ at its larger end, a series of conical rolls $g$ fitted to the seats upon the casing and hub with their larger ends against the shoulder $w$, a bearing-ring having a ball-race fixed rigidly upon the larger end of the hub and a ball-ring secured to the shell with balls fitted directly between such ball-ring and the ball-race bearing-ring $k$ to resist end movement of the hub within the casing.

2. The combination, with a casing $a$ having an interior tapering seat $b$ with a shell $a'$ ex'ended therefrom and threaded internally, of a conical hub having a conical seat $f$ with annular collar $w$ at its larger end, a series of conical rolls $g$ fitted to the seats upon the casing and hub with their larger ends against the collar $w$, the separate bearing-ring having a ball-race $k$ fitted to the hub against the collar $w$, and the ball-ring $n'$ fitted to the screw-thread within the shell and secured therein when adjusted, with balls between such ball-ring and the ball-race bearing-ring $k$ to hold the hub in position within the casing.

3. A self-contained roller bearing, consisting of a casing $a$ having a tapering seat $b$ in one end and a shell $a'$ upon the other end, a conical hub arranged within the casing and having a conical seat $f$ with annular collars $h$ and $w$ at the smaller and larger ends of the seat respectively, a series of tapering rolls $g$ fitted to the seats upon the casing and hub and having their ends contacting with the said collars, a ball-race-bearing-ring $k$ fitted to the hub in contact with the collar $w$, and a ball-ring secured to the shell with balls fitted directly between such ball-ring and the ball-race bearing-ring $k$, to resist end movement of the hub within the casing.

In testimony whereof I have hereunto set my hand in the presence of two subscribing witnesses.

CHARLES S. LOCKWOOD.

Witnesses:
L. LEE,
THOMAS S. CRANE.